(12) United States Patent
Bayareddy et al.

(10) Patent No.: US 9,025,440 B2
(45) Date of Patent: *May 5, 2015

(54) PREVENTING UPPER LAYER RENEGOTIATIONS BY MAKING PPP AWARE OF LAYER ONE SWITCHOVERS

(75) Inventors: Srinath Bayareddy, San Jose, CA (US); Sunil Bakhru, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 267 days.

This patent is subject to a terminal disclaimer.

(21) Appl. No.: 13/538,574

(22) Filed: Jun. 29, 2012

(65) Prior Publication Data

US 2012/0327763 A1 Dec. 27, 2012

Related U.S. Application Data

(63) Continuation of application No. 12/389,424, filed on Feb. 20, 2009, now Pat. No. 8,233,385.

(51) Int. Cl.
*H04L 12/26* (2006.01)
*H04L 12/28* (2006.01)
*H04L 12/939* (2013.01)
*H04L 12/935* (2013.01)

(52) U.S. Cl.
CPC .......... *H04L 12/2859* (2013.01); *H04L 49/557* (2013.01); *H04L 49/30* (2013.01)

(58) Field of Classification Search
CPC ................ H04L 45/28; H04L 41/0659; H04L 2012/5627

USPC .......................... 370/217, 221, 216, 223, 228
See application file for complete search history.

(56) References Cited

U.S. PATENT DOCUMENTS

| 6,028,861 | A | 2/2000 | Soirinsuo et al. |
| 6,628,671 | B1* | 9/2003 | Dynarski et al. ............. 370/469 |
| 6,694,455 | B1 | 2/2004 | Scrandis et al. |
| 6,714,801 | B1 | 3/2004 | Sugaya |
| 7,363,534 | B1* | 4/2008 | Krishnamurthy et al. ...... 714/13 |
| 7,428,208 | B2* | 9/2008 | Jones et al. .................... 370/216 |
| 2001/0037394 | A1* | 11/2001 | Yoshimura et al. ........... 709/228 |
| 2002/0097683 | A1 | 7/2002 | Yamamoto et al. |
| 2003/0037294 | A1* | 2/2003 | Robsman et al. ................ 714/55 |
| 2008/0205342 | A1* | 8/2008 | Radhakrishnan et al. .... 370/331 |

OTHER PUBLICATIONS

W. Simpson, Internet Engineering Task Force Request for Comments (IETF RFC) 1661, Jul. 1994, pp. 13 and 21.*
Co-pending U.S. Appl. No. 12/389,424, filed Feb. 20, 2009 entitled "Preventing Upper Layer Renegotiations by Making PPP Aware of Layer One Switchovers," by Srinath Bayareddy et al., 23 pages.

(Continued)

*Primary Examiner* — Hassan Phillips
*Assistant Examiner* — Siren Wei
(74) *Attorney, Agent, or Firm* — Harrity & Harrity, LLP

(57) ABSTRACT

A method may include establishing a first Point-to-Point Protocol (PPP) session on an interface, receiving an indication of a layer one failure, omitting for a period of time, an indication that the first PPP session on the interface is down, based on the indication of the layer one failure, establishing a layer one switchover to another interface based on the indication of the layer one failure, and attempting during the period of time, to establish a second PPP session on the other interface.

20 Claims, 5 Drawing Sheets

(56) References Cited

OTHER PUBLICATIONS

Troubleshooting "Line Protocol is Down" Problems on POS Interfaces, Document ID 16152, 2008-2009 Cisco Systems, Inc., May 19, 2006, 14 pages.

W. Simpson (Ed), Network Working Group, RFC 1661, The Point-to-Point Protocol (PPP), Jul. 1994, pp. i-ii and 1-52.

W. Simpson, Network Working Group, Applicability Statement for PPP over Sonet/SDH draft-ietf-pppext-sonet-as-00.txt, Aug. 1998, pp. i and 1-21.

A. Tanenbaum, "Computer Networks," Third Edition, ISBN 0-13-34995-6, Copyright 1996 by Prentice Hall PTR, pp. 231-233, for an introduction/description of "PPP—Point-to-Point Protocol."

* cited by examiner

# PREVENTING UPPER LAYER RENEGOTIATIONS BY MAKING PPP AWARE OF LAYER ONE SWITCHOVERS

RELATED APPLICATION

This application is a continuation of U.S. patent application Ser. No. 12/389,424, filed Feb. 20, 2009 now U.S. Pat. No. 8,233,385, which is incorporated herein by reference.

BACKGROUND

The Point-to-Point Protocol (PPP), defined in Request For Comments (RFC) 1661 (hereinafter referred to as the "PPP specification"), provides a standard method for transporting multi-protocol data units over point-to-point links. PPP includes three main components, namely, a method for encapsulation, a Link Control Protocol (LCP) for establishing, configuring, and testing different network-layer protocols, and a number of Network Control Protocols (NCP) for establishing and configuring different network layer protocols. The PPP includes mechanisms for renegotiations when a lower layer failure occurs.

SUMMARY

According to one implementation, a method performed by a device and may include establishing, by the device, a first Point-to-Point Protocol (PPP) session on an interface, receiving, by the device, an indication of a layer one failure, omitting, by the device, for a period of time, an indication that the first PPP session on the interface is down, based on the indication of the layer one failure, establishing, by the device, a layer one switchover to another interface based on the indication of the layer one failure, and attempting, by the device, during the period of time, to establish a second PPP session on the other interface.

According to another implementation, a device may include a first communication interface to establish a Point-to-Point Protocol session, identify a layer one failure, delay, for a period of time, to indicate that the PPP session is down, perform a switchover to a second communication interface, and the second communication interface to attempt to establish, during the period of time, another PPP session.

According to still another implementation, a computer-readable medium may store executable instructions, that when executed, cause a processor to establish a Point-to-Point Protocol (PPP) session on a communication interface, provide an indication when a layer one failure occurs on the communication interface, perform a switchover, which includes establishing another layer one session on another communication interface, when the indication is provided, omit, for a period of time, an indication that the PPP session is down, and attempt to establish, during the period of time, another PPP session on the other communication interface.

According to another implementation, a device may include means for establishing a layer one session, means for establishing a Point-to-Point Protocol session with respect to the layer one session, means for determining when the layer one session goes down, means for performing a switchover to establish another layer one session when it is determined that the layer one session has gone down, means for delaying, for a period of time, a marking down of the PPP session, means for attempting to establish, during the period of time, another PPP session with respect to the other layer one session, and means for marking the PPP session down when the other PPP session is not established before the period of time expires.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention. Rather, the scope of the invention is defined by the appended claims and equivalents.

The term "data unit," as used herein, may refer to a packet, a datagram, or a cell; a fragment of a packet, a datagram, or a cell; or another type or arrangement of data.

As described herein, a network device, utilizing the PPP, may prevent layer three protocols and above from performing renegotiations during a layer one switchover. The PPP is considered a layer two protocol, which includes the LCP and the NCP. In one embodiment, the network device may include working interfaces and protect interfaces as a form of redundancy. Additionally, the network interface may include a pseudo-interface. The working interfaces and the protect interfaces may host layer one and the LCP. The pseudo-interface may host the NCP and upper layers (i.e., layer three protocols and above).

Based on this configuration (i.e., by splitting up the LCP and the NCP), the network device may recognize when a working interface goes down, that this failure relates to a layer one switchover (e.g., an automatic protection switching (APS) event). In such instances, the network device may not immediately mark down layer two (the PPP layer) in reaction to a layer one switchover, which is typically the case according to the PPP specification. Rather, the network device may provide a period of time for the LCP layer and the NCP layer to renegotiate a session. If the PPP layer is successful in renegotiating a session on a protect interface, before the period of time expires, the upper layers are not disturbed by the switchover. On the other hand, if the PPP layer is not successful in renegotiating a session before the period of time expires, the network device may mark the PPP layer as down. In such an instance, subsequent states of the network device may follow in accordance with the PPP specification.

As a result of the foregoing, by delaying the marking down of the PPP layer, the upper layers are insulated from a layer one switchover, so that renegotiations and convergence delay (e.g., the re-building of network topology information, routing information, etc.) may be avoided, as well as other advantages that necessarily flow therefrom.

Exemplary Network

Figure 1:
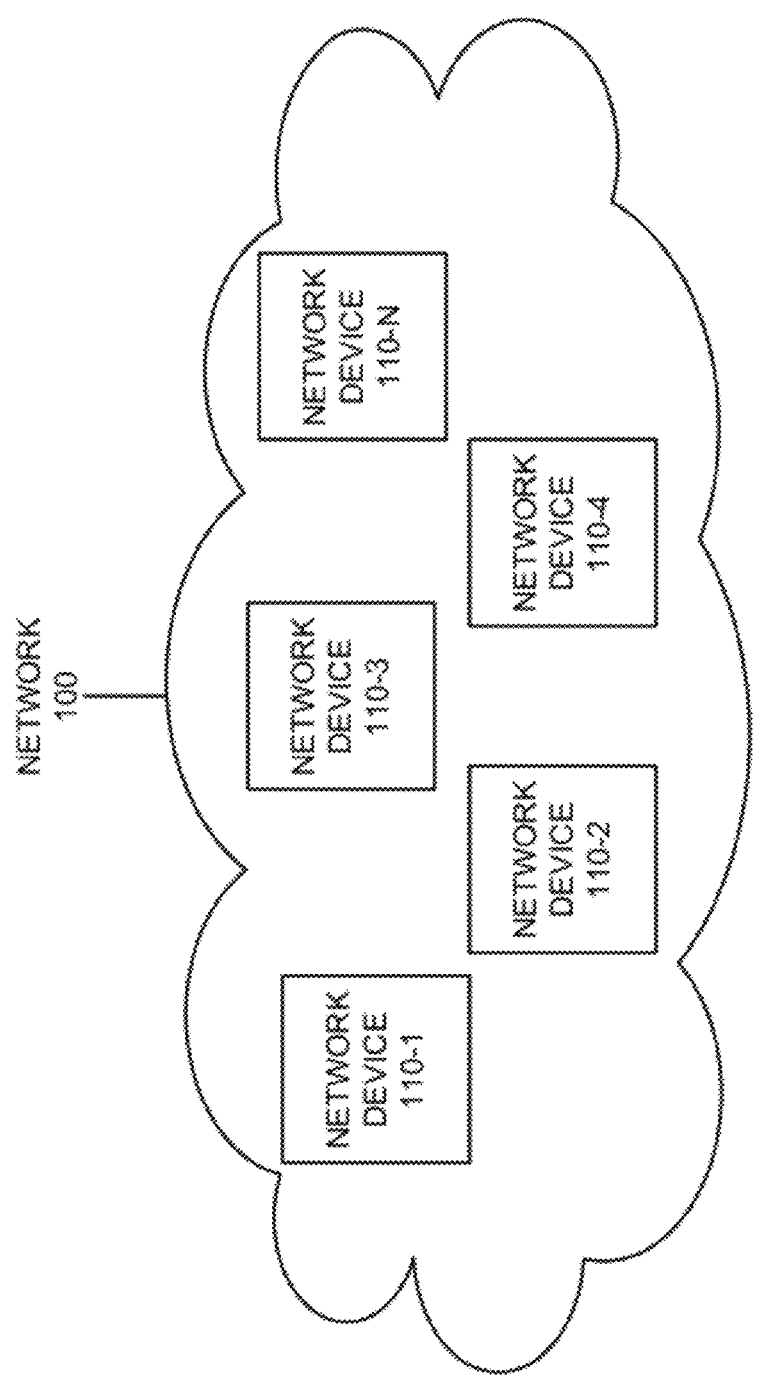
FIG. 1 is a diagram of an exemplary network in which methods, devices, and systems, described herein, may be implemented.

FIG. 1 is a diagram of an exemplary network 100 in which methods, devices, and systems, described herein, may be implemented. Network 100 may include one or multiple networks of any type. By way of example, network 100 may include a private network, a public network, the Internet, an ad hoc network, a local area network (LAN), a wide area network (WAN), a metropolitan area network (MAN), and/or a telephone network (e.g., a wireless communication network or the public switched telephone network (PSTN)).

As shown, network 100 may include N network devices 110-1 through 110-N (collectively referred to herein as "network devices 110," or generically as "network device 110") (N≥1). Network device 110 may include a switch, a router, a server, or another type of device. While network device 110 can be implemented as different types of devices, in the following paragraphs, network device 110 will be described in terms of a router. The links interconnecting network devices 110 may be wireless and/or wired. Additionally, the interconnections between network devices 110 may include redundancy.

Figure 2:
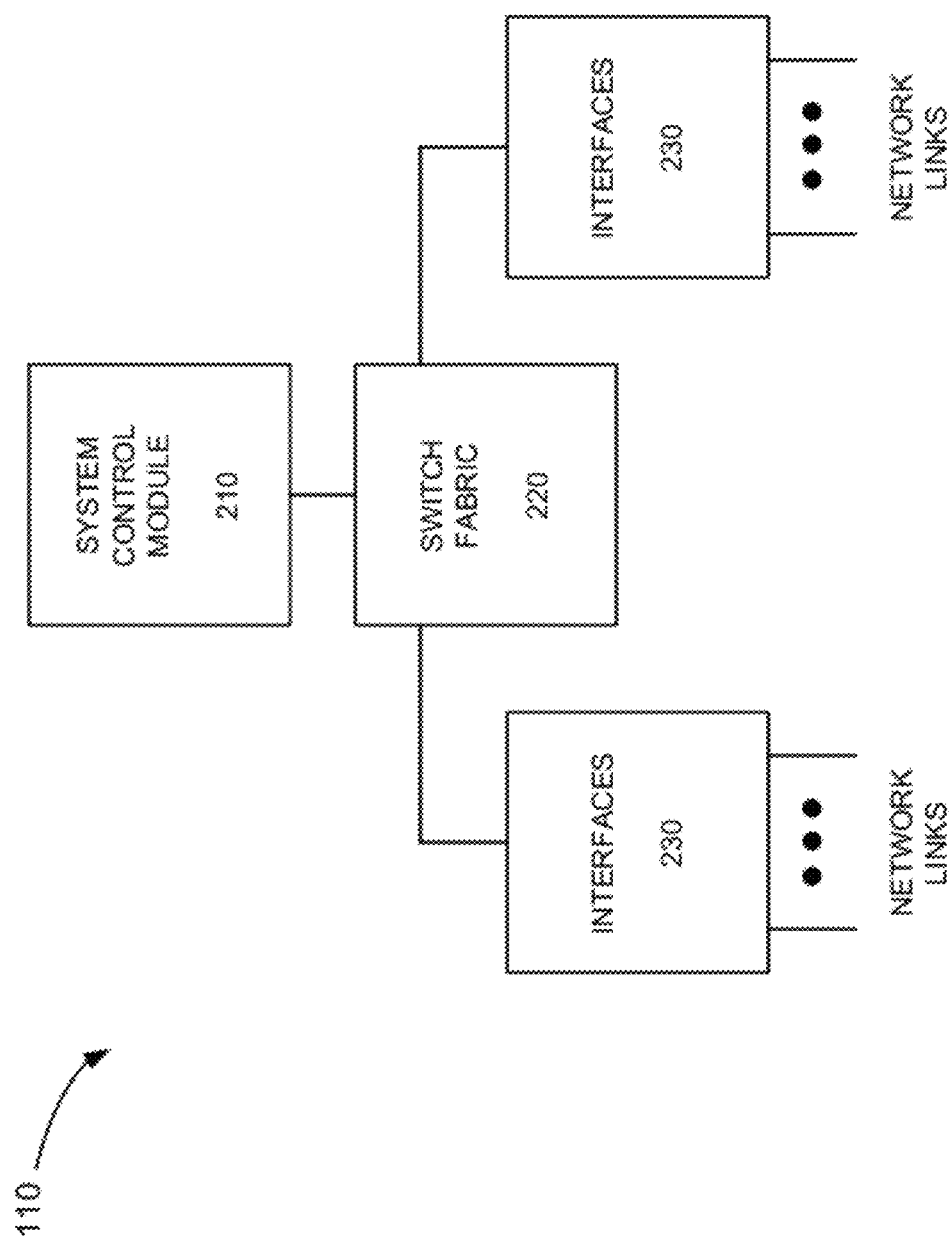
FIG. 2 is a block diagram illustrating exemplary components of a network device of FIG. 1.

FIG. 2 is a diagram illustrating exemplary components of network device 110. As illustrated in FIG. 2, network device 110 may include a system control module 210, a switch fabric 220, and a group of interfaces 230. In other implementations, network device 110 may include fewer, additional, different, or differently arranged components than those illustrated in FIG. 2.

System control module 210 may include one or multiple processors, microprocessors, application specific integrated circuits (ASICs), field programming gate arrays (FPGAs), and/or processing logic that may be optimized for networking and communications. System control module 210 may perform high level management functions for network device 110. For example, system control module 210 may communicate with other networks, devices, and/or systems connected to network device 110 to exchange information regarding network topology. In some implementations, system control module 210 may include a routing engine for creating routing tables based on network topology information, creating forwarding tables based on the routing tables, and sending these tables to interfaces 230 for data unit routing. System control module 210 may also include a static memory (e.g. a read only memory (ROM)), a dynamic memory (e.g. a random access memory (RAM)), onboard cache, and/or flash memory for storing data and/or machine-readable instructions.

Switch fabric 220 may include one or multiple switching planes to facilitate communication among interfaces 230 and/or system control module 210. In one implementation, each of the switching planes may include a single-stage switch or a multi-stage switch of crossbar elements. Switch fabric 220 may also, or alternatively, include processors, memories, and/or paths that permit communication among system control module 210 and interfaces 230.

Interfaces 230 may include devices or assemblies, such as line cards, for receiving incoming data units from network links (or from other interfaces 230) and for transmitting the data units to network links (or to other interfaces 230). For example, interfaces 230 may include wireless and/or wireless interfaces, such as, Ethernet interfaces, optical carrier (OC) interfaces, and/or asynchronous transfer mode (ATM) interfaces. Interfaces 230 may manage a set of input ports via which data units can be received and a set of output ports via which data units can be transmitted. Interfaces 230 may include memory, one or more processors, and/or other logic.

Depending on the implementation, the components that are illustrated in FIG. 2 may provide fewer or additional functionalities. For example, if network device 110 performs an Internet Protocol (IP) data unit routing function as part of a Multi-Protocol Label Switching (MPLS) router, system control module 210 may perform tasks associated with obtaining routing information from other routers in a MPLS network. In such cases, conveying network traffic from one interface to another may involve label-based routing, rather than IP address-based routing.

Figure 3:
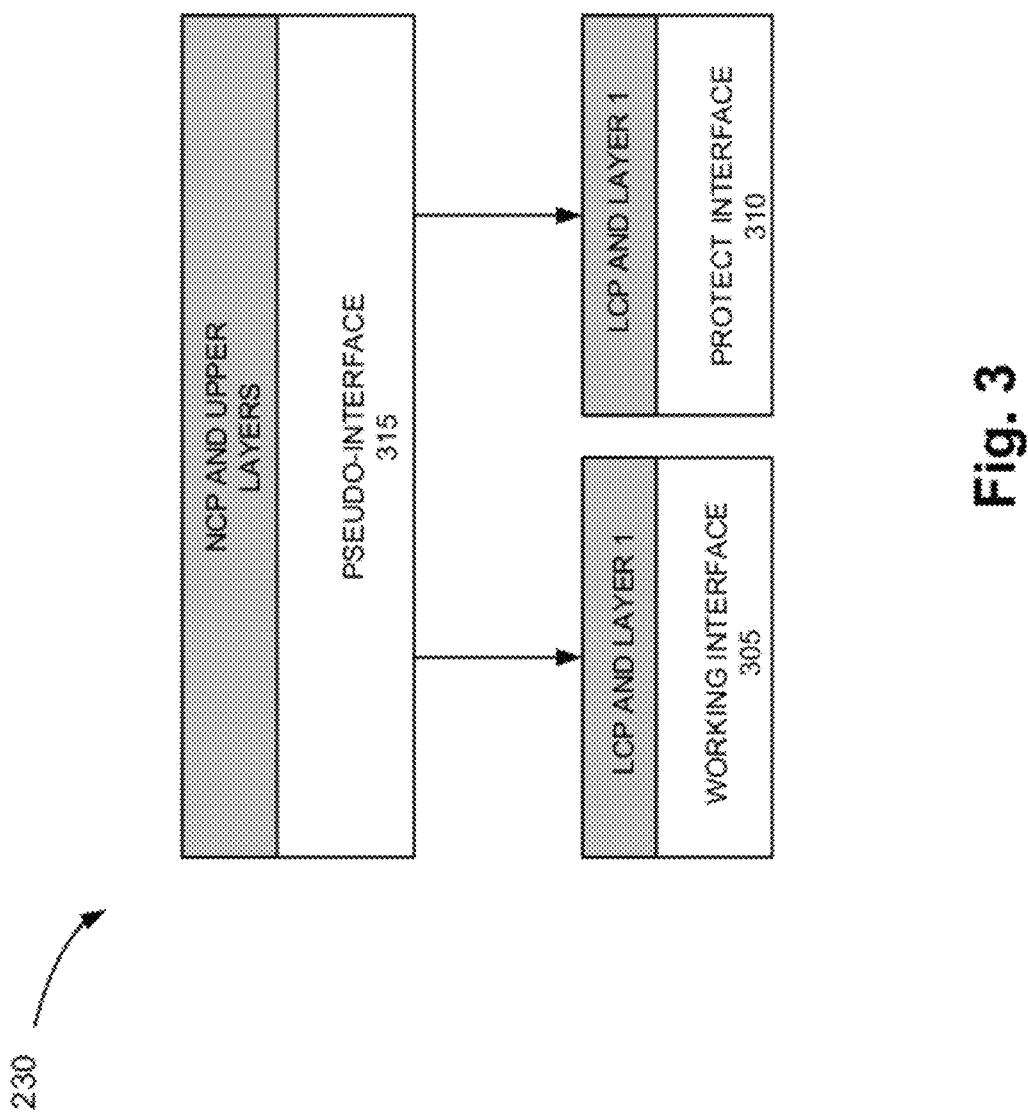
FIG. 3 is a block diagram illustrating exemplary functional components of an interface of FIG. 2.

FIG. 3 is a block diagram illustrating exemplary components of interface 230. As shown, interface 230 may include a pseudo-interface 315, a working interface 305, and a protect interface 310. In different implementations, interface 230 may include fewer, additional, different, or differently arranged components than those illustrated in FIG. 3. Working interface 305, protect interface 310, and pseudo-interface 315 may be implemented in hardware, or a combination of software and hardware.

Working interface 305 may provide layer one functionality and LCP functionality associated with the PPP specification. Protect interface 310 may provide layer one functionality and LCP functionality associated with the PPP specification. Working interface 305 and protect interface 310 may provide a form of redundancy. For example, when working interface 305 suffers from a failure, network device 110 may utilize protect interface 310 as a back-up interface.

Pseudo-interface 315 may provide NCP functionality associated with the PPP specification and upper layer functionality (e.g., layer three functionality and above). In such a configuration, LCP functionality and NCP functionality associated with the PPP specification are split up between interfaces.

Exemplary Process

Figure 4:
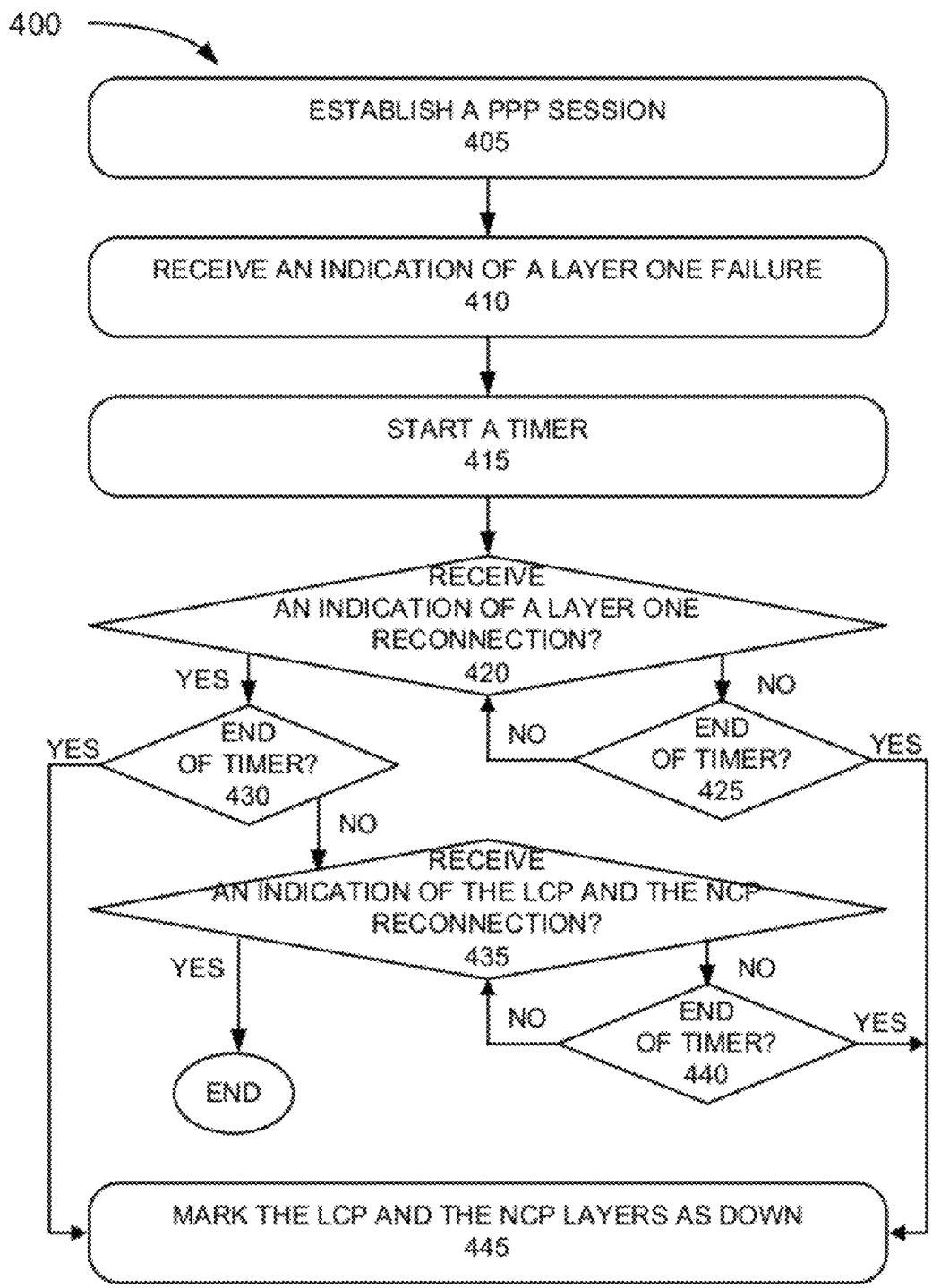
FIG. 4 illustrates a flowchart of an exemplary process for preventing upper layer renegotiations when a layer one switchover occurs.
Figure 5:
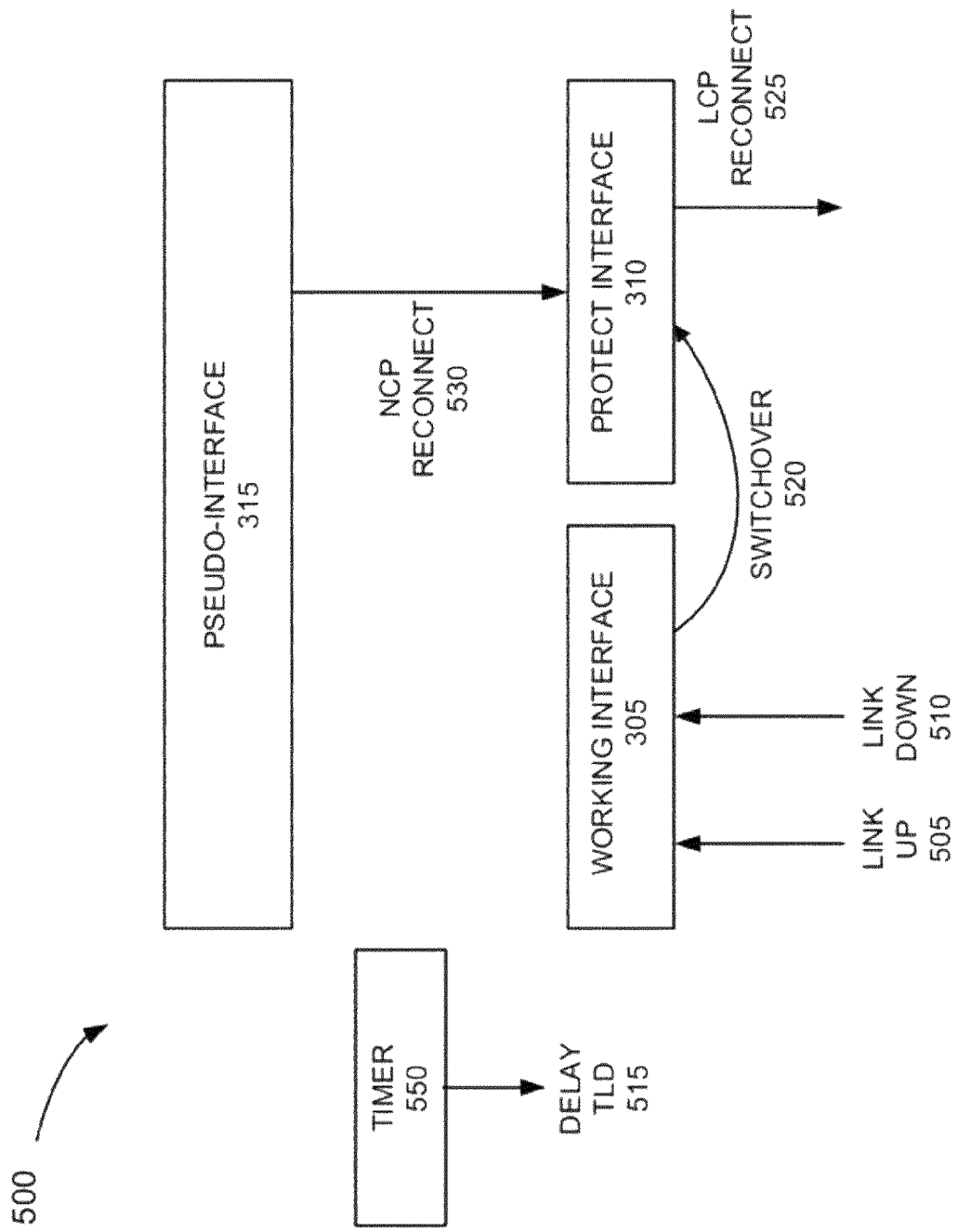
FIG. 5 is a diagram illustrating an exemplary scenario consistent with an exemplary implementation of the process depicted in FIG. 4.

FIG. 4 illustrates a flowchart of an exemplary process for preventing upper layer renegotiations when a layer one switchover occurs. Process 400 may be performed by interface 230 and/or another component separate from or in conjunction with interface 230. FIG. 5 is a diagram illustrating an exemplary scenario consistent with an exemplary implementation of process 400.

Process 400 may begin with establishment of a PPP session (block 405). For example, network device 110 may establish a connection with another device on interface 230 (e.g., on working interface 305), as illustrated in FIG. 5 (link up 505). As provided in the PPP specification, a PPP link may be in an OPEN state once a PPP session is established.

Returning to FIG. 4, an indication of a layer one failure may be received (block 410). For example, the connection with the other device on interface 230 may fail, as illustrated in FIG. 5 (link down 510). Subsequently, as described in the PPP specification, while in the OPEN state (i.e., state 9), the PPP layer may receive a This-Layer-Down (TLD)/1 event, which notifies the PPP layer of the layer one failure (i.e., that layer one has gone down) on working interface 305.

Returning to FIG. 4, a timer may be started (block 415). Network device 110 (e.g., interface 230) may start a timer 550 once the This-Layer-Down (TLD)/1 event is received, as illustrated in FIG. 5 (delay TLD 515). The timer may be user-configurable. The timer may provide a period of time for the LCP and the NCP to establish a new session (e.g., a reconnection on protect interface 310). The PPP layer may enter a START state (i.e., state 1), as defined in the PPP specification. This is in contrast to the PPP specification in which the PPP layer would go into a TLD state.

Returning to FIG. 4, it may be determined whether an indication of a layer one reconnection is received (block 420). Network device 110 (e.g., interface 230) may attempt a switchover 520 to protect interface 310, as illustrated in FIG. 5. If it is determined that a layer one connection has not been established (block 420—NO), it may be determined whether the timer has expired (block 425). If the timer has not expired (block 425—NO), interface 230 may continue to wait for switchover 520 to successfully occur. On the other hand, if it is determined that the timer has expired (block 425—YES), then process 400 may proceed to block 445, as described below.

Alternatively, if it is determined that a layer one connection has been established (block 420—YES), it may be determined whether the timer has expired (block 430). If the timer has not expired (block 430—NO), then process 400 may continue to block 435, as described below. On the other hand, if it is determined that the timer has expired (block 430—YES), then process 400 may proceed to block 445, as described below.

It may be determined whether an indication of the LCP and the NCP reconnection is received (block 435). As illustrated in FIG. 5, once switchover 520 is known to be successful, a LCP reconnect 525 and a NCP reconnect 530 may be attempted. In practice, NCP reconnect 530 may not occur until after the LCP layer successfully reconnects (i.e., is in an OPEN state).

If it is determined that LCP and NCP connections have not been established (block 435—NO), it may be determined whether the timer has expired (block 440). If the timer has not expired (block 440—NO), interface 230 may continue to wait for LCP and NCP connections to successfully occur. On the other hand, if it is determined that the timer has expired (block 440—YES), then process 400 may proceed to block 445, as described below.

Alternatively, if it is determined that LCP and NCP connections have been established (block 435—YES), then process 400 may end. For example, the timer may be cancelled. In this case, the upper layers (e.g., layer 3 and above) are insulated from the layer one switchover and do not need to renegotiate sessions.

If the timer has expired (block 425—YES, block 430—YES, or block 440—YES), the LCP and the NCP layers may be marked as down (block 445). Interface 230 may mark the LCP and the NCP layers as down, in accordance with the PPP specification. Layer three and upper layers may correspondingly be marked as down until reconnections on the lower layers are reestablished.

Although FIG. 4 illustrates an exemplary process 400, in other implementations, process 400 may include additional, fewer, or different operations than those described.

CONCLUSION

Implementations, described herein, may provide a PPP interface that is aware of layer one switchovers and reduces renegotiations, delays, etc., from occurring.

The foregoing description provides illustration and description, but is not intended to be exhaustive or to limit the invention to the precise form disclosed. Modifications and variations are possible in light of the above teachings or may be acquired from practice of the invention. For example, other protocol specifications may perform unnecessary renegotiations when a layer one switchover occurs. Thus, it will be appreciated that the concepts described herein may have application to protocols, other than the PPP.

While a series of blocks has been described with regard to FIG. 4, the order of the blocks may be modified in other implementations. Further, non-dependent blocks may be performed in parallel.

Also, certain portions of the implementations have been described as "logic" or a "component" that performs one or more functions. The term "logic" or "component" may include hardware, such as a processor, an ASIC, or a FPGA, or a combination of hardware and software (e.g., software running on a processor). The term "computer-readable medium" may include a memory, a secondary storage device, a compact disc (CD), a digital versatile disc (DVD), or some other type of medium capable of storing data and/or instructions. The computer-readable medium may be implemented in a single device, in multiple devices, in a centralized manner, or in a distributed manner.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The term "and/or" is intended to be interpreted to include any and all combinations of one or more of the associated list items.

What is claimed:

1. A method comprising:
    establishing, by a device, a first Point-to-Point Protocol (PPP) session on a first interface, the first PPP session including a first link control protocol (LCP) session and a network control protocol (NCP) session;
    receiving, by the device, an indication of a layer one failure on the first interface,
    a layer three protocol, associated with the first PPP session, not being marked as down during a period of time following the layer one failure;
    attempting, by the device and during the period of time following the layer one failure, to establish, based on the indication of the layer one failure on the first interface, a second PPP session on a second interface that differs from the first interface,
        attempting to establish the second PPP session on the second interface during the period of time including:

attempting, during the period of time, to establish a second LCP session on the second interface, the second LCP session being different from the first LCP session; and when the second LCP session is established on the second interface during the period of time, attempting, during the period of time, to move the NCP session from the first interface to the second interface to establish the second PPP session;

switching, by the device, to the second PPP session when the second PPP session is established on the second interface during the period of the time; and marking, by the device and after expiration of the period of the time, the layer three protocol as down when the second PPP session is not established on the second interface during the period of the time.

2. The method of claim 1, further comprising:
starting, based on receiving the indication of the layer one failure, a timer associated with the period of time.

3. The method of claim 1, further comprising:
determining whether the period of time has expired before the second PPP session on the second interface is established; and
providing, only when the period of time has expired before the second PPP session on the second interface is established, an indication of a failure of the first PPP session associated with the layer one failure on the first interface.

4. The method of claim 3, further comprising:
receiving a user input, and
determining, based on the user input, the period of time.

5. The method of claim 1, where the first interface is a working interface,
where the second interface is a protection interface, and
where attempting to establish the second PPP session includes attempting to establish the second PPP session on the protection interface.

6. The method of claim 1, where attempting to establish the second LCP session further includes:
initiating, during the period of time, a start state; and
attempting to establish the second LCP session during the start state.

7. The method of claim 1, where receiving the indication of the layer one failure includes:
receiving a notice of a This-Layer-Down (TLD)/1 event; and
identifying the layer one failure based on the notice of the TLD/1 event.

8. A device, comprising:
one or more processors to:
identify a layer one failure in a first communication interface,
the first communication interface being associated with a first Point-to-Point Protocol (PPP) session,
the first PPP session including a first link control protocol (LCP) session and a network control protocol (NCP) session,
the layer one failure causing a layer three failure, of a layer three protocol, associated with the first PPP session, and
the layer three protocol not being marked as down during a period of time following the layer one failure,
attempt to establish, during the period of time following the layer one failure, a switch over to a second PPP session on a second communication interface that differs from the first communication interface,
the one or more processors, when attempting to establish the second PPP session on the second communication interface, being further to:
attempt, during the period of time, to establish a second LCP session on the second communication interface,
the second LCP session being different from the first LCP session, and
when the second LCP session is established on the second communication interface during the period of time, attempt, during the period of time, to move the NCP session from the first communication interface to the second communication interface to establish the second PPP session, and
mark the layer three protocol as down after the period of time following the layer one failure when the second LCP session is not established on the second communication interface during the period of time following the layer one failure.

9. The device of claim 8, where the first communication interface corresponds to a working interface, and
where the second communication interface corresponds to a protection interface that is used based on a failure of the working interface.

10. The device of claim 9, where the one or more processors, when attempting to establish the switch over, are further to:
establish a pseudo-interface to host the NCP session,
the pseudo-interface differing from the working interface and the protection interface, and
move the NCP session, via the pseudo-interface, from the working interface to the protection interface.

11. The device of claim 8, where the one or more processors are further to:
send a notification of a failure of a PPP layer only when the period of time expires before the second PPP session is established.

12. The device of claim 8, where the one or more processors are further to:
receive a user input, and
determine, based on the user input, the period of time.

13. The device of claim 8, where the layer one failure includes a failure of one or more hardware components associated with the first communication interface.

14. The device of claim 8, where the layer one failure is associated with an automatic protection switching (APS) event.

15. A non-transitory computer-readable medium to store instructions, the instructions comprising:
one or more instructions which, when executed by one or more processors, cause the one or more processors to:
establish, via a first communication interface, a communication session including a first Point-to-Point Protocol (PPP) session,
the first PPP session including a first link control protocol (LCP) session and a network control protocol (NCP) session,
detect a layer one failure on the first communication interface,
a LCP layer and a NCP layer not being marked as down during a period of time following the layer one failure,
switch over, based on detecting the layer one failure and during the period of time following the layer one failure, the communication session to a second PPP session on a second communication interface that differs from the first communication interface when the second PPP session is established on the second communication interface during the period of the time, the one or more instructions to switch over including:
one or more instructions to establish, on the second communication interface, a second LCP session that differs from the first LCP session, and
one or more instructions to transfer, after establishing the second LCP session on the second communication interface, the NCP session to the second communication interface; and
mark the LCP layer and the NCP layer as down after the period of time when the second PPP session is not established on the second communication interface during the period of the time.

16. The non-transitory computer-readable medium of claim 15, where the layer one failure includes a failure of one or more hardware components associated with the first communication interface.

17. The non-transitory computer-readable medium of claim 15, where the instructions further comprise:
one or more instructions to determine whether switching over the communication session is completed during the period of time, and
one or more instructions to send a notification of a layer three failure only when switching over the communication session is incomplete when the period of time expires.

18. The non-transitory computer-readable medium of claim 17, where the instructions further comprise:
one or more instructions to receive a user input, and
one or more instructions to determine, based on the user input, the period of time.

19. The non-transitory computer-readable medium of claim 15, where the one or more instructions to establish the communication session include:
one or more instructions to establish the NCP session via a pseudo-interface, and
where the one or more instructions to switch over the communication session include:
one or more instructions to establish the NCP session via the pseudo-interface and the second communication interface.

20. The non-transitory computer-readable medium of claim 15, where the first communication interface is a working interface,
where the second communication interface is a protection interface, and
where the one or more instructions to transfer the NCP session to the second communication interface include:
one or more instructions to transfer the NCP session to the protection interface.

\* \* \* \* \*